July 20, 1965  L. P. HORWITZ  3,196,411
QUANTIZED FLUX CRYOGENIC DEVICE
Filed July 30, 1962  4 Sheets-Sheet 1

INVENTOR
LAWRENCE P. HORWITZ
BY *Elmer W. Galbraith*
ATTORNEY

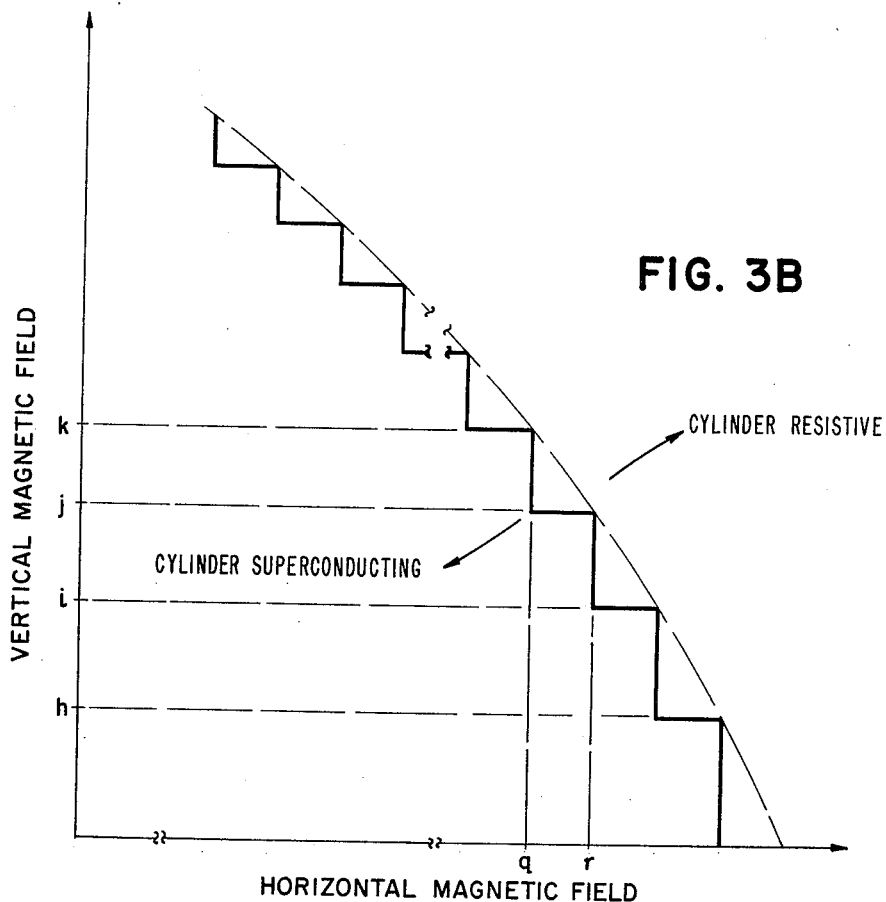
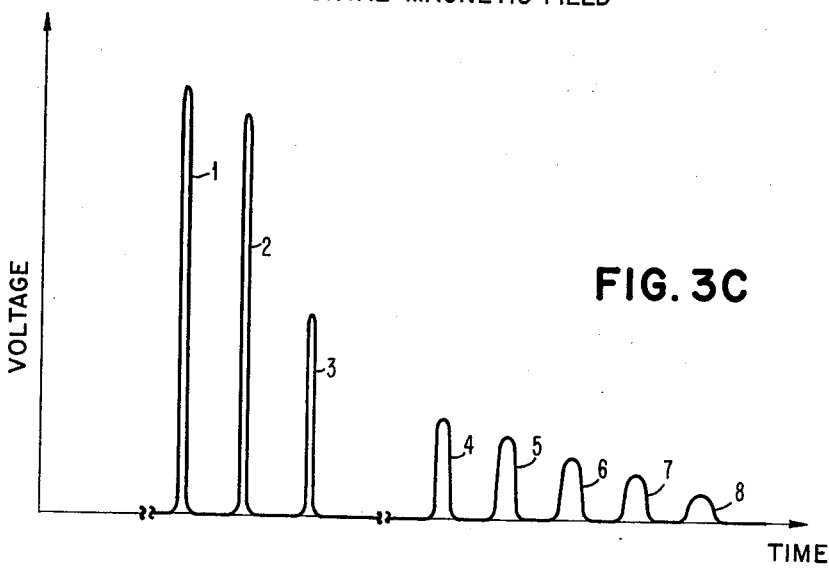

July 20, 1965 L. P. HORWITZ 3,196,411
QUANTIZED FLUX CRYOGENIC DEVICE
Filed July 30, 1962 4 Sheets-Sheet 4
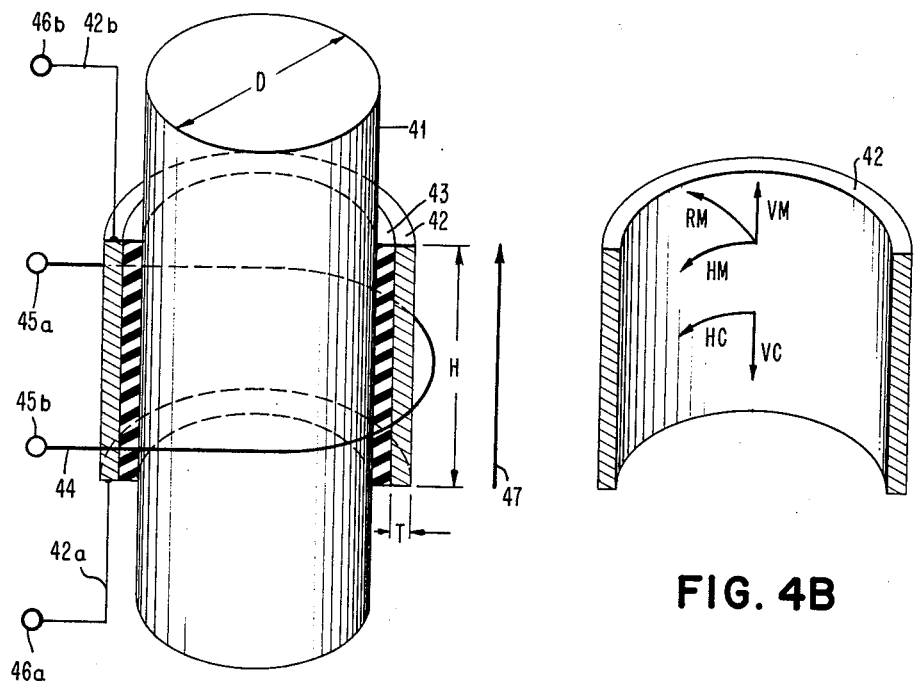
FIG. 4A
FIG. 4B
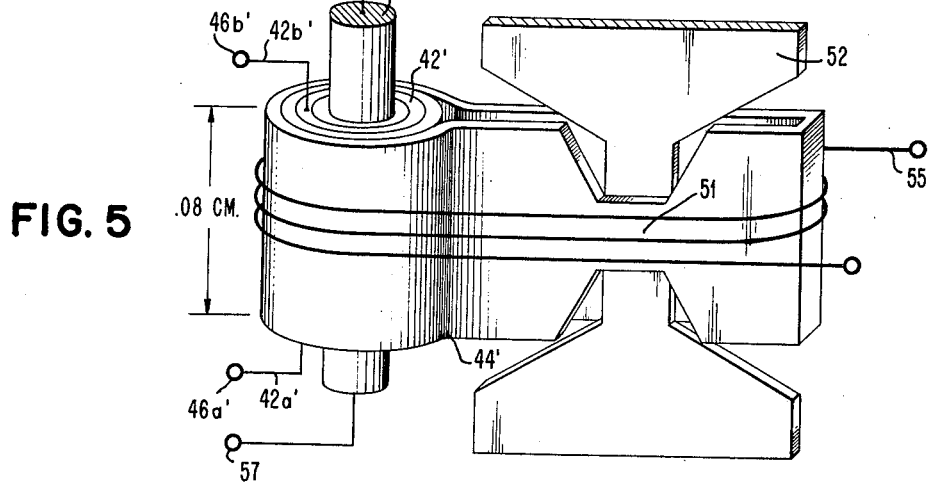
FIG. 5

United States Patent Office 3,196,411
Patented July 20, 1965

3,196,411
QUANTIZED FLUX CRYOGENIC DEVICE
Lawrence P. Horwitz, Chappaqua, N.Y., assignor to International Business Machines Corporation, New York, N.Y., a corporation of New York
Filed July 30, 1962, Ser. No. 213,279
4 Claims. (Cl. 340—173.1)

This invention relates to electrical circuitry and more particularly to superconductive circuitry.

It is known that only certain "quantized levels" of flux can stably exist inside a closed loop of superconductive material. A possible theoretical explanation of this phenomenon is discussed in the references hereinafter cited. The present invention relates to an information storage device which utilizes the above phenomenon. The device of the present invention utilizes the different quantized flux levels to indicate different bits of information. The fact that quantized flux levels exist was known; however, it was not known how these quantized flux levels could be used in a practical information storage device.

The phenomenon upon which the device of the present invention operates is a phenomenon which has its foundation in the principles of quantum mechanics. It is well known that (a) electric charge is "quantized" by the electrons which form the charge, (b) that the electrons in atoms have certain "quantized" energy levels at which they can exist, (c) that the light spectrum is "quantized," (d) that the angular momentum of electrons is "quantized," etc. Similarly it is known that the flux threading through a closed loop of superconductive material can only exist at certain "quantized" levels. These quantized levels are not merely different from each other, but they differ from each other by certain definite calculable amounts. An analysis of Schrodinger's wave equation shows the particular flux levels which can exist inside a closed loop of superconductive material. Flux levels other than the permitted or "quantized" flux levels are prohibited non-stable states and forces (reaction currents) are generated in order to prevent the prohibited flux levels from existing. In the device of the present invention a certain amount of flux (a certain number of quanta of flux) are stored in a closed loop of superconductive material. These quanta are then sequentially released producing a series of pulses which are counted to determine the number of flux quanta initially stored.

On a macroscopic scale any amount of flux can exist inside a closed loop of superconductive material because the difference between the various "quantized" levels is a microscopic phenomenon. The prior art shows many devices which store flux in a closed loop of superconductive material; however, the differences between the various "quantized levels" is totally insignificant compared to the levels of flux which are stored in such devices. Hence, in such devices it appears that any level of flux can exist. The difference between the device of the present invention and the devices shown in the prior art which store flux in a closed loop of superconductive material is similar to the difference between a device which operates based upon storing different values of electric charge and a device which operates based upon storing a discrete number of electrons. A much more sophisticated structure is needed to actually differentiate between the different numbers of electrons (a microscopic phenomenon) than is needed to differentiate between different amounts of electric charges (a macroscopic phenomenon). Similar to the manner that electric charge is quantized by "electrons" the flux stored in a closed superconductive loop is quantized. The device of the present invention uses these different "quantized" levels of flux to store information.

An object of the present invention is to provide an improved information storage device.

Another object of the present invention is to provide a small, relatively inexpensive information storage device.

Still another object of the present invention is to provide a means for selectively changing the amount of flux threading through a thin walled cylinder by one quantum.

Another object of the present invention is to provide a device for releasing flux from a closed loop of superconductive material in quantized amounts.

Yet another object of the present invention is to provide a means for initiating and detecting a one quanta change in the flux threading through a thin walled cylinder.

The foregoing and other features, objects and advantages of the invention will be apparent from the following more particular description of the invention as illustrated in the accompanying drawings.

FIGURE 2B is a graph showing the reaction current in the cylinder with the external field on.

FIGURE 3B is a graph showing the summation of the horizontal and vertical components of the magnetic field in the cylinder.

FIGURE 3C is a graph showing the output pulses.

FIGURE 4A is a cut-away perspective view of a first embodiment of the invention.

FIGURE 4B is a cut-away perspective view of the cylinder shown in FIGURE 4A.

FIGURE 5 is a perspective view of the second embodiment of the invention.

Figure 1:
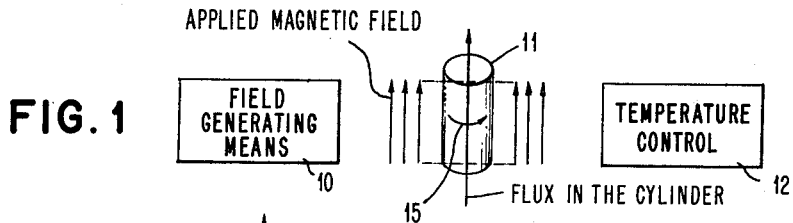
FIGURE 1 is a schematic view of a system which is used to explain the principles upon which the present invention is based.

FIGURE 1 shows several elements which are used to explain the principle of the present invention. The elements shown include a field generating means 10, a thin walled indium cylinder 11 and a temperature control 12. The indium cylinder 11 has a superconductive state and a resistive state and temperature control 12 can change cylinder 11 from the superconductive state to the resistive state and vice versa by changing the temperature. The cylinder 11 is positioned in the magnetic field generated by field generating means 10.

The elements shown in FIGURE 1 are operated as follows: Temperature control 12 is first set so that cylinder 11 is resistive. While cylinder 11 is resistive a certain amount of magnetic field is generated by field generating means 10. The magnetic field is held constant and temperature control 12 lowers the temperature so that cylinder 11 becomes superconducting.

Figure 2A:
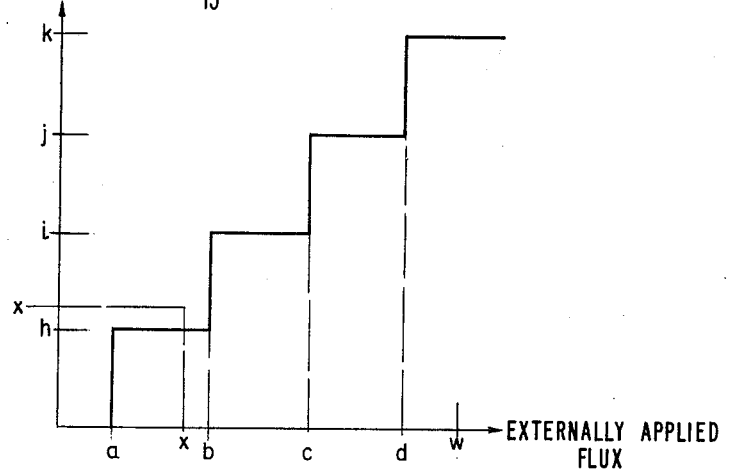
FIGURE 2A is a graph showing the possible levels of flux threading through a cylinder.

When the cylinder 11 is in the resistive state, the amount of flux inside the cylinder is directly related to the amount of flux generated by field generating means 10. However, when cylinder 11 is superconducting, the flux inside the cylinder can only have certain discrete "quantized levels." These "quantized levels" are shown in FIGURE 2A as levels $h$, $i$, $j$, $k$, etc. If, for example, when cylinder 11 is resistive the field inside cylinder 11 (i.e., the field generated by field generating means 10) has a value which is anywhere in the region between $a$ and $b$ on the horizontal axis in FIGURE 2A, the magnitude of the flux in the cylinder after the cylinder is made superconducting will be $h$. Likewise, if when the cylinder 11 is resistive the amount of flux inside the cylinder is anywhere in the region between $b$ and $c$ on the horizontal axis in FIGURE 2A, the amount of flux in the cylinder after it is made superconductive will be $i$ units, etc.

Figure 2B:
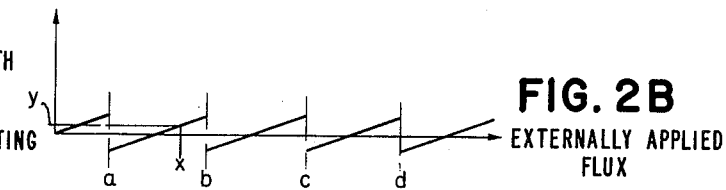

Since any particular amount of flux can exist inside the cylinder when it is in the resistive state, and only certain discrete quantized amounts of flux can exist inside the cylinder when it is in the superconductive state, some mechanism must change the amount of flux inside the cylinder if a forbidden level of flux exists at the time that the cylinder is made superconductive. The mechanism which changes the amount of flux is current flowing in the cylinder in the direction indicated by arrow 15. These currents are hereinafter called horizontal reaction currents. If cylinder 11 is in a resistive state with a forbidden level of flux therein, and the cylinder is changed from the resistive state to the superconductive state, a horizontal reaction current is generated which is sufficient so that the resulting flux in the cylinder (i.e., the vector sum of the initial flux and the flux generated by the reaction current) is one of the allowed quantized levels. The amount and direction of the horizontal reaction current in the cylinder 11 for various amounts of applied magnetic field are shown in FIGURE 2B. The horizontal axis in FIGURE 2B indicates the amount of magnetic field applied to the cylinder by field generating means 10 and the vertical axis indicates the amount and direction of the horizontal reaction current in the cylinder after the cylinder is changed from the resistive state to the superconductive state.

The above and related phenomena are well known in the art and they are described among other places in the following references:

(1) B. S. Deaver and W. M. Fairbank, Phys. Rev. Letters, 7, 50 (1961).

(2) R. Doll and M. Naubauer, Phys. Rev. Letters, 7, 51 (1961).

(3) N. Beyers and C. N. Yang, Phys. Rev. Letters, 7, 46 (1961).

(4) J. M. Blatt, Phys. Rev. Letters, 7, 82 (1961).

(5) J. Bardeen, Phys. Rev. Letters, 7, 162 (1961).

(6) J. B. Keller and B. Zumino, Phys. Rev. Letters, 7, 164 (1961).

(7) A. H. Nethercott, Jr., Phys. Rev. Letters, 7, 226 (1961).

Figure 2C:
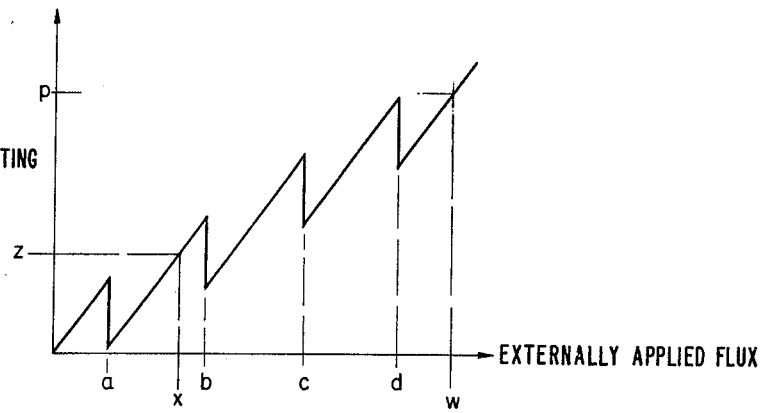
FIGURE 2C is a graph showing the reaction current in the cylinder with the external field off.

It is also known that the amount of flux passing through or threading through a superconductive cylinder cannot change when the external magnetic field is changed. The previous discussion of the operation of the device shown in FIGURE 1 relates to the situation which occurs when the magnetic field generated by field generating means 10 remains unchanged and cylinder 11 is changed from the superconductive state to the resistive state by temperature control 12. If, after cylinder 11 is changed from the resistive state to the superconductive state, the applied magnetic field (i.e., the field generated by field generating means 10) is reduced to zero, the flux passing through the cylinder remains unchanged. When the applied field is reduced, a horizontal reaction current in the direction of arrow 15 begins to flow, and this horizontal reaction current maintains the field inside the cylinder constant. The horizontal reaction current which holds the flux inside the cylinder at the same level even though the amount of externally applied field is changed is in addition to the previously described horizontal reaction current shown in FIGURE 2B. The total amount of horizontal reaction current in cylinder 11 after the applied field is reduced to zero for various amounts of applied field present as the cylinder is changed from the resistive state to the superconductive state is shown in FIGURE 2C.

For example, if when cylinder 11 is resistive, field generating means 10 generates $x$ units of magnetic field inside the cylinder 11 and while these $x$ units of magnetic field are present temperature control 12 changes cylinder 11 from the resistive state to the superconductive state the flux inside the cylinder will change to $h$ units since $x$ units of flux is not an allowable state (see FIGURE 2A). After the cylinder is made superconductive a reaction current of $y$ units circulates in the direction indicated by arrow 15 (FIGURE 2B). If thereafter the external field is reduced to zero, the flux in the cylinder does not change; however, the amount of reaction current increases to $z$ units as indicated by FIGURE 2C.

The structure of the first embodiment of the present invention is shown in FIGURE 4A. This structure includes a copper conductor 41, an indium cylinder 42, a sheet of electrical insulating material 43, copper lead wires 42a and 42b connecting cylinder 42 between terminals 46a and 46b and a copper sense wire 44 connected between two terminals 45a and 45b. It should be noted that cylinder 42 and insulating sheet 43 completely surround conductor 41. They are shown cut-away in FIGURE 4A for the purpose of illustration. The entire device shown in FIGURE 4A is positioned inside of the coil (not shown) which generates a vertical magnetic field (indicated by arrow 47) throughout the entire region where the device is located. The cylinder 42 is similar to cylinder 11 in FIGURE 1 and the coil (not shown) which generates magnetic field 47 is equivalent to field generating means 10 in FIGURE 1.

The cylinder 11 shown in FIGURE 1 is changed from the superconductive state to the resistive state and vice versa by temperature control 12. Variations in temperature are difficult to control and hence varying the temperature is not a very practical manner of changing a cylinder from its superconductive state to its resistive state and vice versa. The device shown in FIGURE 4A is maintained at a temperature such that cylinder 42 is superconductive if no current is flowing therein. The cylinder is changed to the resistive state by the application of current between terminals 46a and 46b. Current applied between these terminals flows through cylinder 42 and if the current exceeds the critical current of the cylinder, the cylinder changes from the superconductive state to the resistive state. Hence, there is no need to change the temperature of the cylinder. Conductors 41, 42a, 42b and 44 may be made of a superconductive material; however, they need not be. Herein it will be assumed that they are made of copper.

The dimensions of the structure are tabulated below:

| Dimension | Indicated in the Figure as— | Magnitude |
| --- | --- | --- |
| Diameter of conductor 41 | D | 13.5 microns. |
| Height of cylinder 42 | H | .8 centimeter. |
| Thickness of cylinder 42 | T | 3.8 microns. |
| Inner diameter of cylinder 42 | | 14.5 microns. |

A cut-away perspective view of cylinder 42 is shown in FIGURE 4B. Two different magnetic fields can be present at the surface of cylinder 42. The first magnetic field is the magnetic field generated by the coil (not shown) which generates magnetic field 47. This magnetic field is in a vertical direction, hence, it is hereinafter referred to as the the vertical magnetic field and it is designated (see FIGURE 4B) VM. The vertical magnetic field VM is the magnetic field which is stored or trapped inside of the cylinder 42 when the cylinder is changed from the resistive state to the superconductive state.

Current passed through conductor 41 generates a horizontal magnetic field designated HM. The horizontal magnetic field HM and the vertical magnetic field VM add vectorially to produce a resultant magnetic field designated RM. As previously explained under certain conditions a horizontal reaction current is generated in cylinder 42. The direction of the horizontal reaction current is indicated by the arrow designated HC in FIGURE 4B. In order to change cylinder 42 from a superconductive state to the resistive state, current is passed through the cylinder 42 from terminals 46a and 46b. This current flows in cylinder 42 in a generally vertical direction substantially as indicated by the arrow designated VC in FIGURE 4B. A vertical current VC is also generated by the horizontal magnetic field HM.

The device shown in FIGURE 4A operates as follows: First, a certain amount of flux, i.e., a certain number of quanta of flux, are stored in cylinder 42. This is accomplished by passing current between terminals 46a and 46b in order to make the cylinder 42 resistive and by externally applying a magnetic field in the direction indicated by arrow 47 (by means of a coil which is not shown) while the cylinder is resistive. While the externally applied flux is in the cylinder the current flow between terminals 46a and 46b is terminated, thereby allowing cylinder 42 to become superconductive and trapping a certain amount of flux in cylinder 42. The external field 47 is then terminated. At this point an amount of flux, for example, equal to four quanta (indicated as level $k$ in FIGURE 2A) is stored inside cylinder 42. The number of quanta of flux stored depends upon the magnitude of magnetic field 47.

In order to read information from the device, i.e., in order to determine the number of flux quanta stored in the cylinder 42 an increasing current (shown in FIGURE 3A) is passed through conductor 41. As the current in conductor 41 increases, the flux stored in cylinder 42 escapes from the cylinder in "quantized" amounts producing a series of pulses in sense line 44. If four quanta of flux are initially stored in the cylinder, i.e., if the flux in cylinder 42 is initially at the level indicated as $k$ in FIGURE 2A, as the current in conductor 41 increases, the flux first decreases to level $j$ then to level $i$ and finally to level $k$. As the flux decreases, as each quantum of flux escapes from cylinder 42, a quantum of flux crosses sense wire 44 thereby producing a pulse. The pulses on line 44 can be counted to determine the number of quanta of flux initially stored in cylinder 42.

One of the fundamental principles upon which the present invention is based is that the flux escapes from cylinder 42 in "quantized" amounts thereby producing a succession of pulses in line 44. The mechanism through which the quantized amounts of flux escape from cylinder 42 will now be explained in terms of the magnetic fields generated during the operation of the device. An equivalent explanation could be given in terms of the current present in the device.

Figure 3A:
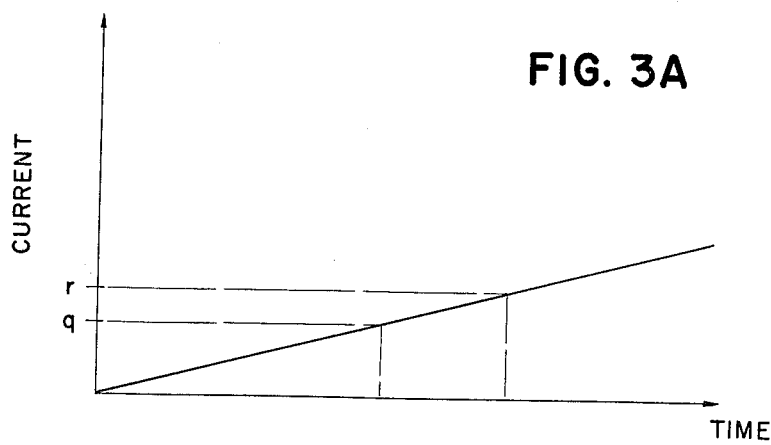
FIGURE 3A is a graph showing the readout current as a function of time.

If the amount of magnetic flux 47 applied while the cylinder 42 is resistive is equal to the amount indicated as $w$ in FIGURE 2A, an amount of vertical magnetic flux VM equal to the amount designated $k$ in FIGURE 2A is stored in cylinder 42 after it becomes superconductive and as shown in FIGURE 2C after the external field 47 is terminated a horizontal reaction current HC equal to $p$ will flow in cylinder 42. If, thereafter, the current in conductor 41 is increased as shown in FIGURE 3A, an increasing horizontal magnetic field HM due to the increasing current in conductor 41 results. The horizontal magnetic field HM and the vertical magnetic field VM adds vectorially to produce a resultant magnetic field RM. When the resultant magnetic field RM reaches the critical magnetic field of cylinder 42, cylinder 42 becomes resistive. In FIGURE 3B wherein the horizontal axis shows the amount of horizontal magnetic field HM incident on cylinder 42 and the vertical axis indicating the amount of vertical magnetic field VM incident on cylinder 42 the dotted line shows the various combinations of horizontal magnetic field HM and vertical magnetic field VM that produce a resulting magnetic field which is larger than the critical magnetic field of cylinder 42. When the horizontal magnetic field and the vertical magnetic field have values the intersection of which in FIGURE 3B is to the right of the dotted line the resulting magnetic field RM is larger than the critical field of cylinder 42 and cylinder 42 is resistive.

According to the previously given example, four quanta of flux were initially stored in cylinder 42. Hence, the vertical magnetic field VM had a value of $k$ units (see FIGURES 2A and 3B). When the current in conductor 41 reaches a value which generates a horizontal magnetic field HM equal to $q$ units (see horizontal axis in FIGURE 3B) the resulting magnetic field RM equals the critical magnetic field of the cylinder 42. Hence, cylinder 42 changes from the superconductive state to the resistive state.

After the cylinder changes from the superconductive state to the resistive state the vertical magnetic flux VM is no longer trapped inside the cylinder and the flux inside the cylinder begins to expand to the outside cylinder (a mathematical statement of the rate at which the flux escapes or expands from the cylinder is given later). As the flux escapes from the cylinder it crosses sense line 44 thereby producing a voltage pulse in sense line 44. After one quanta of flux escapes from cylinder 42, the vertical magnetic field VM is decreased to the amount indicated by the letter $j$ in FIGURES 2A and 3B. After one quantum of flux escapes from the cylinder (with the horizontal magnetic HM still substantially at $q$ units), the resulting magnetic field RM no longer exceeds the critical field of the cylinder 42 and hence the cylinder 42 returns to the superconductive state. As the current in conductor 41 continues to increase, the horizontal magnetic field HM continues to increase and when the horizontal magnetic field HM reaches the value designated $r$ in FIGURE 3B the resulted magnetic field RM again exceeds the critical current in the cylinder 42. Hence, the cylinder 42 changes from the superconductive state to the resistive state and another quanta of flux escapes from cylinder 42 cutting sense line 44 and producing a voltage pulse in sense line 44. The flux in the cylinder is then reduced to the value designated by the $i$ in FIGURES 2A and 3B and the resultant magnetic field RM no longer exceeds the critical current of the cylinder; hence, the cylinder changes from the resistive state back to the superconductive state. As the current in conductor 41 continues to increase, the above described process continues until each of the four quanta of flux trapped in cylinder 42 escapes. By counting the number of pulses which appear on sense line 44, the number of quanta of flux initially stored in cylinder 42 can be determined.

For the geometry shown in FIGURE 4A with the dimensions previously given, the magnitude of the pulses appearing on sense line 44 would be in the neighborhood of 10 to 20 microvolts and the width of the pulses is in the neighborhood of $10^{-10}$ seconds.

The characteristics of the pulses which appear on sense line 44 are determined by two factors. The first factor is the amount of flux which crosses sense line 44 and the second factor is the rate at which the flux crosses sense line 44. Where only a small number of flux quanta are initially stored in cylinder 42 each time cylinder 42 changes from the superconductive state to the resistive state only one quantum of flux crosses sense line 44. Later the case where more than one quantum of flux escapes from cylinder 42 each time the cylinder changes from the superconductive state to the resistive state is discussed.

In the previously cited references, it is shown that one quantum of flux is equal to $2.07 \times 10^{-7}$ gauss-centimeters$^2$. The rate at which the flux crosses sense line 44 can be determined from the following well known relationship:

$$Z = Z_0 e^{-t\frac{R}{L}}$$

where:
Z = the flux inside of the cylinder at any instant
$Z_0$ = the amount of flux in the cylinder when the cylinder changes from a superconductive state to a resistive state
e = the base of the natural logarithm
t = time
R = the resistance of the material in the cylinder in the resistive state
L = the inductance of the structure with respect to currents flowing in a horizontal direction.

The rate at which the flux leaves the cylinder and hence the magnitude of the voltage on sense line 44 is given by the following expression:

$$\frac{dZ}{dt} = \frac{Z_0}{L/R} e^{-t\frac{R}{L}}$$

The total width of each pulse on sense line 44 is approximately given by the following expression:

$$d = \frac{L/R}{n}$$

where:
d = the width of each pulse in seconds
n = the number of quanta of flux in the cylinder when the cylinder is changed from the superconductive state to the resistive state
Q = the magnitude of one quantum of flux From the above expressions it is easily seen that as the number of quanta of flux in the cylinder increases, the magnitude of the voltage pulses which appear on sense line 44 increases and the width of these pulses decreases.

One of the important factors in the present invention is the control of the current applied to readout line 41. The magnitude of the current applied to readout line 41 is in the shape of a slowly increasing ramp function. If the current in line 41 increases too rapidly, the pulses on sense line 44 appear so rapidly that it is not possible to differentiate between individual pulses. The magnitude of the current applied to control line 41 is directly related to the critical magnetic field of cylinder 42. The magnitude of the current needed in readout line 41 in order to readout any particular quanta of flux is given by the following expression:

$$I = 36 \times 10^{-4} \sqrt{H_c^2 - (0.13n)^2}$$

where:
I = the current in conductor 41
$H_c$ = the amount of magnetic field needed at the inner surface of cylinder 42 in order to change cylinder 42 from the superconductive state to the resistive state (this is approximately equal to the critical magnetic field for a film of the same material and the same thickness as cylinder 42)
n = the number of quanta of flux stored in cylinder 42

The above expression shows the amount of current needed in conductor 41 in order to make cylinder 42 resistive with respect to the number of flux quanta stored in cylinder 42. Considering that at a reasonable operating temperature indium has a critical magnetic field of approximately 50 oersteds. If four quanta of flux are initially stored in cylinder 42 the device will have a threshold, i.e., the first quantum will escape when the current in conductor 41 reaches approximately .216 ampere. The next quantum will escape when the current is thereafter increased by 3.5 microamperes, the third quantum will escape when the current is increased an additional 2.6 microamperes and the last quantum will escape when the current is increased an additional 1.5 microamperes. The manner of generating the current needed in conductor 41 is known in the art. A current which has the required magnitude could, for example, be generated by a very high precision potentiometer or by slowly charging a large capacitor and using the the voltage across the capacitor to drive conductor 41.

The previous description of the operation of the device related to the operation of the device when a relatively small number of quanta of flux were initially stored in cylinder 42. Cylinder 42 is capable of holding a very large number of flux quanta. For the specific cylinder shown in the neighborhood of four hundred thousand quanta of flux could be stored in cylinder 47 before the vertical magnetic field VM due to these flux quanta would of itself change cylinder 42 from the superconductive state to the resistive state. Operating the device with a relatively large number of flux quanta stored therein is more difficult than operating the device with a small number of flux quanta stored therein for the following reasons:

As previously stated the rate at which the flux inside of cylinder 42 expands to the outside of the cylinder 42 after the cylinder is changed from the superconductive state to the resistive state is dependent upon the amount of flux stored in the cylinder when the cylinder changes from the superconductive state to the resistive state. If a large number of flux quanta are stored in the cylinder, the flux expands to the outside of the cylinder more quickly. Therefore, one flux quanta leaves the cylinder in a shorter period of time when there are a large number of flux quanta stored in the cylinder. The same amount of flux crossing sense line 44 in a shorter period of time generates a pulse with a larger magnitude and a shorter duration.

Superconductive material such as indium or tin requires a certain amount of time to change from the superconductive state to the resistive state and likewise it requires a certain amount of time to change from the resistive state to the superconductive state. If the amount of time required for the cylinder to change from the superconductive state to the resistive state and then back from the resistive state to the superconductive state is longer than the amount of time required for one quanta of flux to escape from cylinder 42 when the resultant magnetic field changes cylinder 42 from the superconductive state to the resistive state, more than one quanta of flux will escape from the cylinder before the cylinder has a chance to change back to the superconductive state.

The operation of the device under conditions whereby more than one quanta of flux escapes from the cylinder each time it changes from the superconductive state to the resistive state and vice versa, as illustrated by pulses 1 and 2 in FIGURE 3C. If a relatively large number of quanta of flux are initially stored in cylinder 42, more than one quanta of flux escape from cylinder 42 each time that the cylinder changes from the superconductive state to the resistive state. When more than one quanta of flux escapes from the cylinder a relatively large pulse appears on sense line 42. These large pulses are indicated by pulses 1 and 2, thereafter when only a small number of quanta remain in the cylinder only one quanta of flux escapes from the cylinder each time it changes from the superconductive state to the resistive state and smaller pulses appear on sense line 44. These smaller pulses are indicated by pulses 3 to 8.

The output pulses which appear at terminals 45a and 45b can either be counted by means of a cryogenic ring circuit or they can be amplified and fed outside of the cryogenic environment and displayed on an oscilloscope.

A structure which includes means for amplifying the output pulses is shown in FIGURE 5. Those components in FIGURE 5 which functionally correspond to similar components in FIGURE 4A are designated by the same numerial used to designate corresponding components in FIGURE 4A; however, in FIGURE 5, the components have a prime notation.

The device shown in FIGURE 5 includes a conductor 41', a cylinder 42' and a sense conductor 44'. The sense conductor 44' is in thin film form. Sense conductor 44' is relatively wide where it surrounds cylinder 42' and it then has a "necked down" portion 51. The portion 51 is used as a cryotron control element. Associated with the cryotron control element 51 is a gating element 52 which is made of a material such as indium which has a superconductive state and a resistive state. The magnetic field generated by current flowing in control conductor 51 changes gating element 52 from the resistive state to the superconductive state. Sense conductor 44' is made of copper.

With the structure shown in FIGURE 4A, the magnitude of the voltage appearing at output terminals 45a and 45b is not substantially increased by winding sense conductor 44 around cylinder 42 a large number of times. The reason for this is that the voltage which appears at terminals 45a and 45b is a function of the rate at which the flux escapes from cylinder 44 and the number of times sense line 44 surrounds cylinder. Since increasing the number of times sense line 44 surrounds cylinder 42 decreases the rate at which the flux escapes from cylinder 44, very little advantage is gained by using a plurality of turns. This difficulty is overcome with the structure shown in FIGURE 5.

Conductor 44' is 0.8 centimeter wide where it surrounds cylinder 42' and it is .04 centimeter wide (the width of element 51 is exaggerated in the drawing for ease of illustration) at the point termed control conductor 51. For convenience in the later discussion conductor 44' is designated as 20 units wide where it surrounds cylinder 42' and one unit wide at that portion designated control segment 51. Since conductor 44' has a necked down portion 51 it can be considered as a current amplifying device providing an amplification of 20.

The operation of the structure shown in FIGURE 5 can be explained as follows: Each unit of conductor 44' which surrounds cylinder 42 can each be considered separately. A certain amount of current is generated in each unit of conductor 44' at the point where it surrounds cylinder 42. This current is then all combined in control element 51 and the magnetic field due to this total current is used to introduce resistance into gating element 52. This effectively provides current amplification. Since conductor 44' only in effect makes one turn around the structure it does not increase the inductance as would having a sense winding with a plurality of turns.

Gating element 52 can be connected into one side of a loop circuit such as those shown in copending application Serial No. 206,537, by John J. Lentz entitled, "Superconductive Circuitry," which is assigned to the assignee of the present invention. Naturally, some type of conventional reset circuitry would have to be provided.

The structure shown in FIGURE 5 also includes a coil 55 which is used to generate the magnetic field designated 47 in FIGURE 4A. For clarity and ease of illustration, no insulating material is shown in FIGURE 5 between the two layers of conductor 44' or between conductor 44' and gating element 52. However, it should be understood that a suitable insulating material is positioned between the layers of conductor 44' and between each side of gating element 52 and conductor 44'.

Conductor 41' is shown connected between two current supply means 56 and 57 to which a ramp function as shown in FIGURE 3A is applied as previously explained with reference to the structure shown in FIGURE 4A. Similar to the structure shown in FIGURE 4A cylinder 42 is connected between two terminals 46a' and 46b'. It should be understood that terminals 56, 54, 46a' and 46b' are merely schematic representatives of current supply means.

The structure shown in FIGURE 5 operates similarly to the structure shown in FIGURE 4A. During the operation a series of current pulses appear in control bar 51 similar to the manner the pulses appeared on sense line 44. Each of these pulses is sufficient to change gating element 52 from the superconductive to the resistive state, thereby changing the state of the loop circuit wherein gating element 52 is connected (not shown herein). After each pulse appears in control element 51 the loop circuit wherein the gating element 52 is connected is reset.

Figure 6:
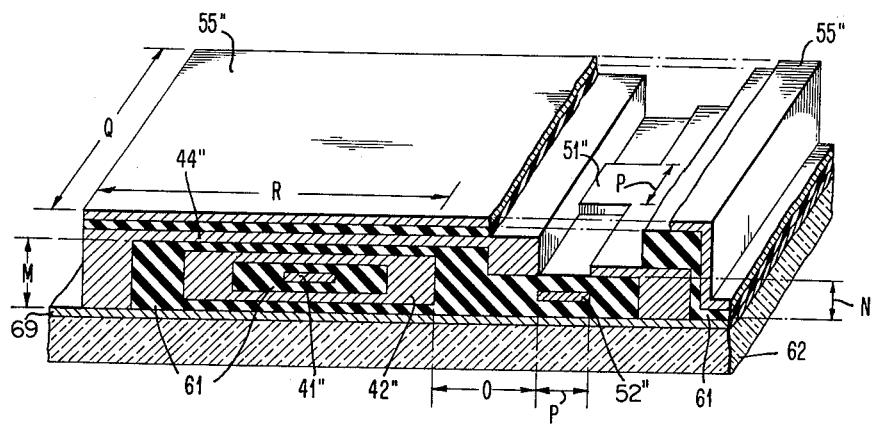
FIGURE 6 is a perspective view of a third embodiment of the invention.

A third embodiment of the invention is shown in FIGURE 6. The third embodiment of the invention is entirely in planar thin film form. In order to show the correspondence between the third embodiment of the invention and the first and second embodiments of the invention, the same numerals used in FIGURES 4A and 5 are used in FIGURE 6 where possible to show corresponding components. However, the numerals used in FIGURE 6 are followed by a double prime notation.

The structure shown in FIGURE 6 includes a readout conductor 41", a cylinder 42" and a sense conductor 44". The entire structure is deposited on a substrate 62 which is covered by a superconducting shield 69. The superconducting shield 69 is used as a return path for current in sense conductor 44". The structure also includes a gating element 52" and a conductor for generating magnetic field 55". A portion of conductor 55" is cut away in order to show control element 51". Each conductor is separated from the other conductors by appropriately insulating material 61.

The dimensions of the structure shown in FIGURE 6 are given below:

$M$=10,000 angstroms
$N$=5,000 angstroms
$O$=1 mil
$P$=5 mils
$Q$=1 centimeter
$R$=35 mils The device shown in FIGURE 6 has all the connections shown in the other embodiments and it operates in the same way as does the device shown in FIGURE 5. For the dimensions shown above the magnetic field generated over gating element 52" by the pulse designated 8 in FIGURE 3B is in the neighborhood of 1.4 oersteds. This is sufficient to change the state of gating element 52" if a temperature near the critical temperature of gating element 52" is used. However, if a relatively high repetition rate is desired, one should use a lower temperature and appropriately bias gating element 52".

The cylinders 42 42' and 42" are shown electrically insulated from readout conductors 41, 41' and 41"; however, they need not be. In a structure having the electrical insulation as shown the readout operation is easier to control.

Conductors 42a and 42b (and the similar conductors in each of the other structures) can be eliminated. If these conductors are eliminated the cylinder 42 is driven resistive in order to store flux therein by a relatively large current in conductor 41. Alternatively, conductor 41 (and the corresponding conductors in each of the other embodiments) can be eliminated and the readout current can be passed through cylinder 42. In this case some means such as a tapered conducting ring on the top and on the bottom of the cylinder must be used in order to insure that the current in the cylinder flows in a vertical direction. The use of a conducting ring on the top and the bottom of the cylinder insures that the cylinder will switch uniformly and it will avoid spurious outputs.

It should be noted that the theoretical explanation as to why certain of the phenomena discussed herein occur is not particularly relevant to the invention. These discussions are merely given as an attempt to aid in the understanding of the invention. There may be other ways in explaining the same phenomena. The present invention relates to a manner of utilizing certain observed phenomena. The theoretical explanation given may aid in the understanding of why the device operates; however, they are not particularly relevant to the invention, since the essence of the invention is concerned with a device for utilizing the phenomena.

While the invention has been particularly shown and described with reference to preferred embodiments thereof, it will be understood by those skilled in the art that the foregoing and other changes in form and details may be made therein without departing from the spirit and scope of the invention.

What is claimed is:

1. A quantized flux information storage device wherein said information is stored as quanta of said flux comprising,
    a thin walled cylinder made of a material having superconductive and resistive states,
    means for storing flux quanta in said cylinder,
    means for selectively releasing flux from said cylinder, one quantum at a time,
    means for sensing the release of each quantum of flux to identify said stored information.

2. An information storage device wherein said information is established as flux quanta comprising,
    an indium cylinder having an inner diameter less than 20 microns, a wall thickness less than 5 microns and and a height greater than one half centimeter,
    an electrical conductor passing through the center of said cylinder and isolated therefrom,
    means for passing current vertically through said cylinder whereby said cylinder can be changed from the superconductive state to the resistive state,
    means for generating vertical magnetic flux in said cylinder to store said information therein, when said cylinder is in a resistive state,
    whereby said vertical flux can be trapped in said cylinder by changing said cylinder from a resistive state to a superconductive state when said vertical flux is in said cylinder,
    means for applying a ramp voltage function to said electrical conductor in order to generate an increasing amount of horizontal magnetic field in said cylinder to identify said stored information,
    whereby said cylinder is changed from a superconductive state to a resistive state thereby releasing one quantum of flux when the vector sum of said horizontal magnetic field and said vertical magnetic field exceeds the critical magnetic field of said cylinder.

3. An information storage device wherein said information is established as flux quanta comprising,
    a thin walled cylinder made of superconductive material, said cylinder having a vertical axis,
    means for storing magnetic flux in said thin walled cylinder representative of said information,
    a conductor passing vertically through the center of said cylinder,
    whereby current in said conductor generates a horizontal magnetic field in said cylinder and when the vector sum of said horizontal magnetic field and said vertical magnetic field exceeds the critical magnetic field of said cylinder, said cylinder momentarily changes from the superconductive state to the resistive state, releasing a quantized amount of flux,
    a conductor substantially as wide as the height of said cylinder surrounding said cylinder, said conductor having a necked down portion,
    a cryotron gating element positioned in flux receiving proximity to said necked down portion of said conductor whereby said necked down portion serves as the control element for said gating element to identify said stored information.

4. A thin film information storage device wherein said information is established as quanta of flux comprising a thin walled cylinder formed from two thin film conductors positioned above each other, said conductors being connected along their ends,
    means for storing first flux in said cylinder to establish said information therein, said flux being in the direction of the axis of said cylinder,
    a conductor in the direction of the axis of said cylinder whereby current in said conductor generates magnetic field in said cylinder in quadrature to said first field,
    said cylinder being driven from the superconductive state to the resistive state when the vector sum of said magnetic fields exceed the critical field of said cylinder,
    a relatively wide conductor surrounding said cylinder, said conductor having a necked down portion,
    a cryotron gating element associated with said necked down portion to identify said stored information.

References Cited by the Examiner

UNITED STATES PATENTS 2,936,435  5/60  Buck _____ 338—32

References Cited by the Applicant

UNITED STATES PATENTS 2,949,602  8/60  Crowe.

IRVING L. SRAGOW, *Primary Examiner.*